United States Patent
Gupta et al.

(10) Patent No.: US 7,466,676 B2
(45) Date of Patent: Dec. 16, 2008

(54) METHOD AND APPARATUS FOR MULTI-CHANNEL MAC PROTOCOL USING MULTI-TONE SYNCHRONOUS COLLISION RESOLUTION

(75) Inventors: Rohit Gupta, Singapore (SG); Ravindra Singh, Singapore (SG); Sajal Kumar Das, Bangalore (IN)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 652 days.

(21) Appl. No.: 10/999,389

(22) Filed: Nov. 30, 2004

(65) Prior Publication Data

US 2006/0114851 A1    Jun. 1, 2006

(51) Int. Cl.
*H04Q 7/00* (2006.01)
(52) U.S. Cl. ........................... 370/329; 370/462
(58) Field of Classification Search .............. None
See application file for complete search history.

(56) References Cited

U.S. PATENT DOCUMENTS

| | | | |
|---|---|---|---|
| 6,628,636 B1 | 9/2003 | Young | |
| 7,266,085 B2* | 9/2007 | Stine | 370/252 |
| 2003/0033394 A1 | 2/2003 | Stine | |

OTHER PUBLICATIONS

Haas et al, Dual Busy Tone Multiple Access (DBTMA) Performance Evaluation, IEEE, pp. 314-319, 1999.*
Wu et al, Intelligent Medium Access for Mobile Ad Hoc Networks with Busy Tones and Power Control, IEEE, pp. 71-76, 1999.*
John A. Stine et al., "Orchestrating Spatial Reuse In Wireless Ad Hoc Networks Using Synchronous Collision Resolution (SCR)", Journal of Interconnection Networks, vol. 3, Nos. 3 & 4 (2002), pp. 167-195.
Nakjung Choi et al., "Multi-Channel MAC Protocol for Mobile Ad Hoc Networks", IEEE 2003, pp. 1379-1382.
Jeffrey P. Monks et al., "A Power Controlled Multiple Access Protocol for Wireless Packet Networks", IEEE INFOCOM, 2001, pp. 1-10.
A. Nasipuri, S. Ye et al., "A MAC Protocol for Mobile Ad Hoc Networks Using Directional Antennas", 6 pages.
Romit Roy Choudhury et al., "Using Directional Antennas for Medium Access Control in Ad Hoc Networks", pp. 59-70.
Young-Bae Ko et al., "Medium Access Control Protocols Using Directional Antennas in Ad Hoc Networks", 9 pages.
Asis Nasipuri et al., "Multichannel CSMA with Signal Power-based Channel Selection for Multihop Wireless Networks", 8 pages.
Asis Nasipuri et al, "A Multichannel CSMA MAC Protocol for Multihop Wireless Networks", 5 pages.

(Continued)

*Primary Examiner*—Frank Duong
(74) *Attorney, Agent, or Firm*—Lisa K. Jorgenson; William A. Munck

(57) ABSTRACT

A multi-tone synchronous collision resolution system permits communication nodes within a MANET to contend simultaneously for a plurality of available channels. The communication nodes contend for access using a synchronous signaling mechanism that utilizes multiple tones in a synchronous manner to resolve contentions. Contentions are arbitrated locally, and a surviving subset of communication nodes is selected. The communication nodes of the surviving subset then transmit data packets simultaneously across the available communication channels.

20 Claims, 7 Drawing Sheets

OTHER PUBLICATIONS

Nitin Jain et al., "A Multichannel CSMA MAC Protocol with Receiver-Based Channel Selection for Multihop Wireless Networks", 8 pages.

Shih-Lin Wu et al., "A New Multi-Channel MAC Protocol with On-Demand Channel Assignment for Multi-Hop Mobile Ad Hoc Networks", pp. 1-22.

Wing-Chung Hung et al., "A Dynamic Multi-Channel MAC for Ad Hoc LAN", Final Version submitted to 21st Biennial Symposium on Communications, Apr. 5, 2002, paper #43, 5 pages.

Supplement to IEEE Standard for Information technology-Telecommunications and information exchange between systems-Local and metropolitan area networks-Specific requirements, Part 11: "Wireless LAN Medium Access Control (MAC) and Physical Layer (PHY) specifications, High-speed Physical Layer in the 5 GHz Band", 91 pages.

John Andrew Stine, "Energy Conserving Protocols for Wireless Data Networks", Ph.D. dissertation, University of Texas at Austin, 2001, 249.

John A. Stine et al., "Orchestrating Spatial Reuse in Wireless Ad Hoc Networks using Synchronous Collision Resolution", Journal of Interconnection Networks, vol. 3, Nos. 3 & 4 (2002), pp. 167-195.

Broadband Radio Access Networks (BRAN); High PErformance Radio Local Area Network (HIPERLAN), Type 1; Functional specification, EN 300 652 v1.2.1 (Jul. 1998), ETSI, 105 pages.

John A. Stine et al., "A Comprehensive Energy Conservation Solution for Mobile Ad Hoc Networks", 5 pages.

John A. Stine et al., "Methods to Achieve Capacity and Quality of Service in Ad Hoc Networks", 2 pages.

Jeremy Elson et al., "Wireless Sensor Network: A New Regime for Time Synchronization", 6 pages.

Kevin H. Grace, "SUMA-The Synchronous Unscheduled Multiple Access Protocol For Mobile Ad Hoc Networks", IEEE, pp. 22-28.

Robert Fleming et al., "Ultra-Wideband for PicoRadio Networks", Aether Wire & Location, Inc., Berkeley Wireless Research Center, Focus 2000: PicoRadio Networks, Jun. 26, 2000, pp. 1-22.

Jeremy Elson et al., "Fine-Grained Network Time Synchronization Using Reference Broadcast", pp. 1-17.

Piyush Gupta et al., "The Capacity of Wireless Networks", pp. 1-48.

Randolph Nelson et al., "Maximum Probability of Successful Transmission in a Random Planar Packet Radio Network", 6 pages.

* cited by examiner $S_A = 3.63$

```
   PHASE 1,
   TIME SLOT 1
        │
        ▼
EACH TX NODE RANDOMLY
  SELECTS A TONE AND
TRANSMITS THE SELECTED TONE
        │
        ▼
 EACH RX NODE LISTENS TO
   THE TONES AND COUNTS
  THE TONES THAT IT HEARS
```

```
   PHASE 1,
   TIME SLOT 3
        │
        ▼
EACH TX NODE RANDOMLY
  SELECTS A TONE AND
TRANSMITS THE SELECTED TONE
        │
        ▼
 EACH RX NODE LISTENS TO
   THE TONES AND COUNTS
  THE TONES THAT IT HEARS
```

METHOD AND APPARATUS FOR MULTI-CHANNEL MAC PROTOCOL USING MULTI-TONE SYNCHRONOUS COLLISION RESOLUTION

TECHNICAL FIELD

The invention relates generally to mobile ad hoc networks (MANETs) and, more particularly, to contention resolution for MAC protocol in a MANET.

BACKGROUND

The documents listed below are incorporated herein by reference and are referred to hereinafter by their corresponding identification numerals show below enclosed in square brackets.

[1] IEEE 802.11 Working Group, "Wireless LAN Medium Access Control (MAC) and Physical Layer (PHY) specifications," 1997.

[2] J. Monks, V. Bharghavan, W. Hwu, "A Power Controlled Multiple Access Protocol for Wireless Packet Networks," in IEEE INFOCOM, April 2001.

[3] A. Nasipuri, S. Ye, J. You and R. Hiromoto, "A MAC Protocol for Mobile Ad Hoc Networks using Directional Antennas," in *IEEE Wireless Communications and Networking Conference (WCNC)*, Chicago, Ill., September 2000.

[4] R. Roy Choudhury, X. Yang, R. Ramanathan and N. H. Vaidya, "Using Directional Antennas for Medium Access Control in Ad Hoc Networks," in *ACM MOBICOM*, Atlanta, Ga., September 2002.

[5] Y.-B. Ko, V. Shankarkumar and N. H. Vaidya, "Medium Access Protocols using Directional Antennas in Ad Hoc Networks," in *IEEE INFOCOM*, March 2000.

[6] A. Nasipuri and S. R. Das, "Multichannel CSMA with Signal Power-based Channel Selection for Multihop Wireless Networks," in *IEEE Vehicular Technology Conference (VTC)*, September. 2000.

[7] A. Nasipuri, J. Zhuang and S. R. Das, "A Multichannel CSMA MAC Protocol for Multihop Wireless Networks," in *IEEE Wireless Communications and Networking Conference (WCNC)*, September. 1999.

[8] N. Jain and S. Das, "A Multichannel CSMA MAC Protocol with Receiver-Based Channel Selection for Multihop Wireless Networks," in *Proceedings of the 9th Int. Conf. on Computer Communications and Networks (IC3N)*, October 2001.

[9] S.-L. Wu, C.-Y. Lin, Y.-C. Tseng and J.-P. Sheu, "A New Multi-Channel MAC Protocol with On-Demand Channel Assignment for Multi-Hop Mobile Ad Hoc Networks," in *IEEE Wire-less Communications and Networking Conference (WCNC)*, Chicago, Ill., September 2000.

[10] W. Hung, K. Law and A. Leon-Garcia, "A Dynamic Multi-Channel MAC for Ad Hoc LAN," in *21st Biennial Symposium on Communications*, April 2002.

[11] IEEE 802.11a Working Group, "Wireless LAN Medium Access Control (MAC) and Physical Layer (PHY) specifications—Amendment 1: High-speed Physical Layer in the 5 GHz band," 1999.

[12] J. Stine, "Energy Conserving Protocols for Wireless Data Networks," Ph.D. dissertation, University of Texas at Austin, 2001.

[13] J. Stine, G. de Veciana, K. Grace, and R. Durst, "Orchestrating Spatial Reuse in Wireless Ad Hoc Networks using Synchronous Collision Resolution," Journal of Interconnection Networks, Vol. 3 No. 3 & 4, September and December 2002, pp. 167-195.

[14] ETSI, EN300 652 V 1.2.1, "Broadband Radio Access Networks (BRAN); High Performance Radio Local Area Network (HIPERLAN) Type 1; Functional Specification, July 1998.

[15] J. Stine and G. de Veciana, "A Comprehensive Energy Conservation Solution for Mobile Ad Hoc Networks," *IEEE International Conference on Communications*, 2002.

[16] J. Stine, B. Durst, and K. Grace, "Methods to Achieve Capacity and Quality of Service in Ad Hoc Networks," *Proceedings of the Army Science Conference*, 2002.

[17] K. Grace, "SUMA—The Synchronous Unscheduled Multiple Access Protocol For Mobile Ad Hoc Networks" *Proceedings Eleventh International Conference on Computer Communications and Networks*, IC3N'2002, October 2002.

[18] 7. J. Mannermaa, K. Kalliomaki, T. Mansten, and S. Turunen. "Timing performance of various GPS receivers." In *Proceedings of the 1999 Joint Meeting of the European Frequency and Time Forum and the IEEE International Frequency Control Symposium*, April 1999, pp 287-290.

[19] www.aetherwire.com/Aether_Wire/Ultra-Wideband_for_PicoRadio_Networks.pdf

[20] J. Elson, L. Girod, and D. Estrin, "Fine-Grained Network Time Synchronization using Reference Broadcasts," http://lecs.cs.ucla.edu/~estrin/papers/wsn-ts.pdf, August 2002.

[21] R. Nelson and L. Kleinrock, "Maximum Probability of Successful Transmission in a Random Planar Packet Radio Network," *Proceedings of the IEEE INFOCOM '83*, 1983, pp. 365-370.

[22] P. Gupta and P. Kumar, "The Capacity of Wireless Networks," *IEEE Transactions on Information Theory*, Vol. 46, No. 2, March 2000, pp 388-404.

Ad hoc networks have been proposed as a solution to wireless networking where nodes are mobile, the range of their mobility exceeds the transmission range of any single transceiver, and there is no existing network infrastructure. Mobile Ad hoc networks (MANET) have a widespread application ranging from military to consumer devices. The following are some of the applications that are useful for MANETs.

MANETs can be used to extend the coverage of wireless LAN by their integration and interoperation with infrastructure network. MANETs have their widespread use in covering blind spots in cellular networks and they can also be used to extend the coverage of cellular networks.

MANETs can also be used for personal area networks, which can be used to build smart home network formed by commercial appliances.

Sensor networks are the group of smart, inexpensive devices with multiple sensors to provide opportunities for enabling, monitoring and controlling target systems. Such sensor nodes have capability for acquiring and embedded processing of variety of data forms. Collaborative signal processing and fusion algorithms are needed to aggregate the distributed data from among the nodes in the network, including possibly multiple modalities of data within a sensor node, to make decisions in a reliable and efficient manner.

MANETs also find their use in establishing ad hoc wireless communication to carry out search and rescue operations, as the infrastructure wireless network is not present.

On military battlefields, there is typically no infrastructure present for wireless communication. Hence MANETs are extensively used by military for communication purposes.

An ad hoc network is a collection of wireless mobile nodes dynamically forming a temporary network without using the existing network infrastructure or centralized administration.

Due to limited transmission range of wireless network interfaces, multiple network hops may be needed for nodes to exchange data with each other across the network. The applications of ad hoc networks are far reaching from supporting 3G technologies, consumer devices to military communications. The current demands of wireless communications and the apparent scarcity of the spectrum to support them requires that there be communication schemes that enable the dynamic reuse of spectrum to support multiple users, as they need it. Ad hoc networking is the proposed paradigm to solve the problem.

The IEEE 802.11 standard for wireless LAN [1] has a medium access control (MAC) protocol designed for sharing a single channel between hosts. Due to the broadcast nature of wireless transmission, when two hosts are communicating, all other hosts within the range of the two hosts must defer their communication in order to avoid collision. IEEE 802.11 suffers from significant throughput degradation as the number of active hosts increases. It also suffers from hidden terminal and exposed terminal problem and is also not fair. A lot of work has been done to improve the throughput of wireless networks, and various approaches have been proposed. One approach is to control the transmission power [2]. The basic idea of power control is to have the sender transmit with power just enough to reach the target node, so that the space blocked by that particular transmission is minimized. Another approach is to use directional antennas instead of omni-directional antennas [3], [4], [5]. Directional antennas are able to transmit signal in one direction, so that the hosts located in other directions can communicate concurrently without interfering with each other. These two approaches improve the throughput by increasing spatial reuse, but still they use only a single channel.

Data transmitted in different channels do not interfere with each other, and thus can take place in the same region simultaneously. So the throughput can increase significantly, proportional to the number of channels in the ideal case. Also having multiple channels can provide further benefits in addition to increased throughput, such as a more simple way to support QOS.

The IEEE 802.11 standard already has multiple channels available for use. Table I summarizes the features of IEEE 802.11.

TABLE I

FEATURES OF IEEE 802.11 STANDARDS

|  | 802.11b | 802.11a |
| --- | --- | --- |
| Physical Layer | DSSS[1] | OFDM[2] |
| Maximum Speed | 11 Mbps | 54 Mbps |
| Frequency Band | 2.4 GHz | 5 GHz |
| Number of Channels | 3 | 8/4[3] |

[1]Direct Sequence Spread Spectrum
[2]Orthogonal Frequency Division Multiplexing
[3]8 for indoor use, 4 for outdoor use.

IEEE 802.11b physical layer (PHY) has 14 channels, 5 MHz apart in frequency [1]. But to be totally non-overlapping and thus feasible for use in the same region, the frequency spacing must be at least 30 MHz. So channels 1, 6 and 11 are typically used for communication in current implementations, and thus we have 3 channels available for use. IEEE 802.11a provides 12 channels, 8 in the low part of the band for indoor use and 4 in the upper part for outdoor use [11]. There is enough motivation for concurrent use of multiple channels, but the current MAC protocol of IEEE 802.11 is designed for sharing a single channel. The main reason for this is that each IEEE 802.11 host is equipped with one half-duplex transceiver, so it can only transmit or listen on one channel at a time. So when a host is listening on a particular channel, it cannot hear the communication taking place on a different channel. Due to this, as observed in [9], if a single-channel MAC protocol (such as IEEE 802.11 DCF) is applied in a multi-channel environment wherein each node may dynamically switch channels, performance degradation may occur (unless additional precautions are taken to manage dynamic channel selection).

The present invention recognizes that it is desirable to a provide multi-channel MAC protocol for wireless mobile ad hoc networks that is capable of utilizing multiple data channels simultaneously.

SUMMARY

According to one aspect of the invention, using multiple data channels facilitates concurrent transmissions going on within a transmission range without contention which results in throughput increase proportional to the number of distinct data channels. Multiple data channels are used without using a full duplex transceiver, which makes the signalling hardware very simple and cheap. Another advantage apart from increased throughput in utilising multiple data channels is that we can also provide Quality of Service (QOS) at the MAC layer. Providing reliable QOS in wireless environments using IEEE 802.11 in ad hoc networks has many problems as it uses only single data channel. Another advantage of this aspect of invention is that using multiple data channels simultaneously across the radio range facilitates the use of routing protocols that use multiple routes to distribute the load across different routes so as to increase the overall system performance of Mobile Ad Hoc Network (MANET).

According to one aspect of the invention, a synchronous signalling mechanism used to resolve contention is capable of achieving high spatial usage across each data channel. The current CSMA protocols do not offer this capability of achieving high spatial usage in distributed fashion. Another advantage of our protocol is that the synchronous signalling mechanism does not suffer from congestion collapse. This means that we can operate wireless medium close to its maximum utilization and thus MAC protocol can also cater for large contender densities per transmission range, which is not possible in existing CSMA based protocols like IEEE 802.11. Any other physical layer technique which uses directional antennas or CDMA techniques to increase physical layer capture of packets will increase the spatial usage of wireless medium, hence this MAC protocol can be designed complementary to physical layer techniques to improve overall system performance.

According to another aspect of the invention, the synchronous signaling used can also provide information regarding the contender density to the higher layers. The routing layer can use this information regarding the contender density to dynamically estimate the traffic at the MAC layer, and thus provide more reliable QOS at network layer. This document does not cover the QOS aspects of this signalling protocol, but we believe that those skilled in art of QOS at the routing and MAC layers will find this information very useful for providing QOS in mobile ad hoc networks.

According to another aspect of the invention, the MAC protocol has no memory and does not suffer from unstable behavior observed in CSMA based MAC protocols; hence MTSCR is fair and does not give preference to nodes unless the signaling is designed to do so. This protocol also does not suffer from hidden terminal and exposed terminal problem due to the synchronous nature of the signaling.

According to another aspect of invention, the synchronous nature of MAC protocol provides a foundation upon which network synchronization and location awareness can be made integral to the access protocol. This document does not cover the aspects regarding the integration of location aware technologies with MAC layer, but those skilled in the art of location aware technologies will find this information very useful for integrating location aware technologies with MAC Layer.

Before undertaking the Detailed Description of the Invention below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
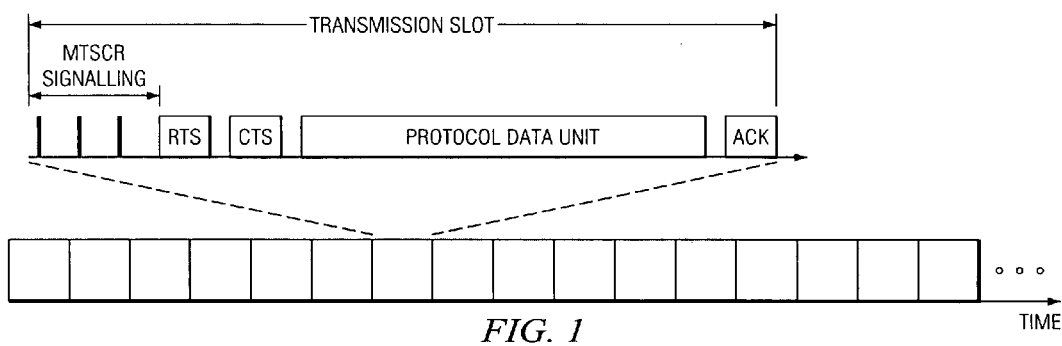
FIG. 1 shows the Multi-tone Synchronous Collision Resolution (MTSCR) MAC protocol.

Exemplary embodiments of the invention provide a new MAC protocol, which enables hosts to dynamically negotiate channels so that multiple communications can take place in the same region simultaneously, each on a different channel. A multiple channel MAC protocol uses frequency tones for synchronous signaling and is termed as Multi tone synchronous collision resolution (MTSCR). MTSCR may more aptly be considered the class of MAC protocols that use synchronous signaling to resolve contentions and to orchestrate spatial reuse of the channel while using multiple channels at the same time. The protocol uses multiple data channels to increase the throughput, while at the same time orchestrates high spatial reuse within each data channel.

MTSCR is unique as a contention-based access protocol since it does not resolve contentions based on the time of contention, as is the case in Aloha and Carrier Sense Multiple Access (CSMA). In these conventional protocols, a contending node gains access by being the only node amongst its neighbors to contend for access. These protocols make no effort to orchestrate the spatial reuse of a channel. They depend on regulating contention attempts so that just one node contends at a time, so they are very susceptible to congestion collapse when the number of nodes contending exceeds the number for which the protocol is tuned. The research presented in [12] and [13] is called Synchronous collision resolution (SCR). SCR requires all contending nodes to participate in a signaling protocol. Through its synchronous signaling mechanism, SCR resolves a subset of nodes from a set of contending nodes, which are spatially separated from each other and, thus, can exchange packets simultaneously using the same radio channel. This distributed process achieves a high spatial reuse of the wireless channel and does not suffer from congestion collapse.

The benefits of synchronizing access attempts are well known (e.g. Slotted Aloha versus Aloha) and the use of signaling to resolve contention is also an established concept (e.g. HIPERLAN 1 [14]). But, SCR and HIPERLAN use only one data channel and achieve spatial reuse within that data channel. The MTSCR protocol according to the invention has benefits provided by SCR as described in [13], while simultaneously using multiple data channels to increase throughput without using a full duplex receiver.

The following assumptions are only exemplary in nature and are provided for clarity of exposition.

1. N data channels are available for use, and all channels have the same bandwidth. None of the channels overlap, so the packets transmitted on different channels do not interfere with each other. Hosts (e.g. mobile wireless communication nodes) have prior knowledge on how many channels are available. For illustration purposes, assume that 12 channels are available for use in the IEEE 802.11a OFDM spectrum.

2. Each host (communication node) is equipped with a single half-duplex transceiver. So a host can either transmit or listen at a time, but cannot do both simultaneously. Also, a host can listen to or transmit on only one channel at a time. So when listening on one channel, it cannot transmit/receive on other channels. Unlike our scheme, many other multi-channel MAC protocols require each host to have multiple transceivers [3], [8], [9].

3. All nodes are perfectly synchronized to a level where signaling can take place synchronously. Global Positioning System (GPS) or any other technologies can achieve the required synchronization for signaling purposes, but this is beyond the scope of this document.

4. For the signaling purposes, we have maximum of 201 available frequency tones. All tones are equally spaced and numbered from 0, 1, 2, 3 ... 200.

5. During signaling phase, each of the tones are nothing but assertion signals and the receiver can detect the presence of these assertion signals, irrespective of the number of nodes transmitting them.

6. Each node is addressed by a unique 16-bit node address which serves as MAC address of the node.

7. Any node that wants to send a packet knows the receiver MAC address and uses this information in signaling, otherwise node uses broadcast channel for signaling to learn receiver MAC address.

FIG. 1 illustrates the MTSCR protocol according to exemplary embodiments of the invention. The radio channel is divided into sequential transmission slots and then each transmission slot is broken up into a series of signals followed by the transmission of a protocol data unit (PDU).

Figure 2:
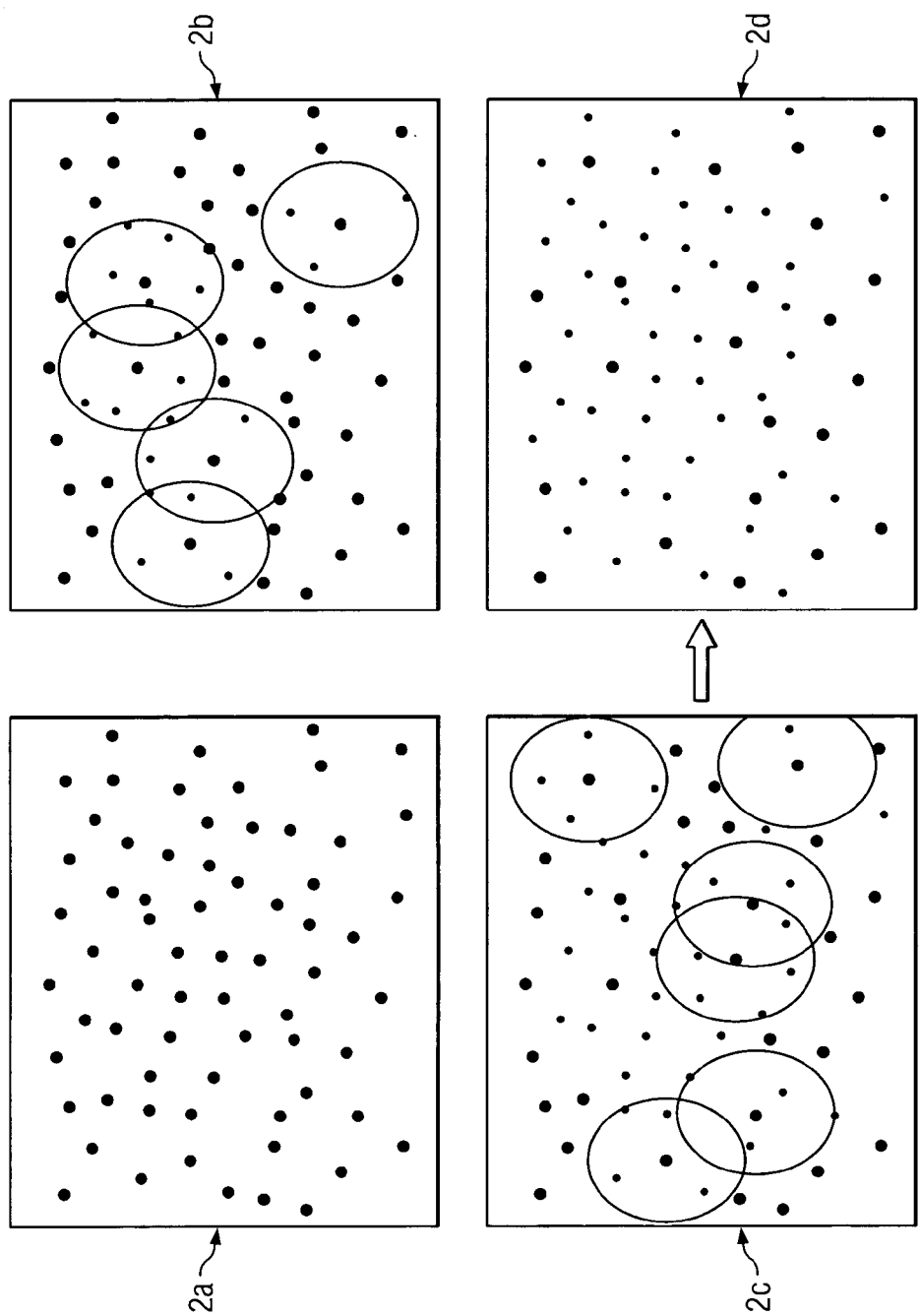
FIG. 2 shows an example of Multi Tone Synchronous Collision Resolution Signaling.

At the beginning of the transmission slot, all nodes with packets to send contend for access to the medium by participating in MTSCR protocol. The series of panels in FIG. 2 illustrates the desired outcome of MTSCR per data channel. Panel 2a illustrates a situation where all nodes in the networks start off as contenders, and then, through a series of signals, two sets of which are illustrated in panels 2b and 2c, these contenders are reduced to the final subset of the contending nodes illustrated in Panel 2d. The large dots are nodes that view themselves as having lost the contention, and the large circles represent the range of the signals. In this example, nodes signal using MTSCR protocol, and at the end of MTSCR signaling each Source/Destination pair knows which channel to use for exchanging RTS/CTS/DATA/ACK packets. At the conclusion of the MTSCR signaling, the surviving contenders attempt to execute a handshake with their destinations at the data channel, which they resolve at the end of MTSCR signaling.

At the end of MTSCR signaling, each source/destination pair knows which data channel to use for exchanging RTS/CTS/DATA/ACK packets. The exchange of RTS/CTS packets finalizes the exchange of DATA/ACK packets. Hence, the surviving contenders at the end of MTSCR signaling send a request-to-send (RTS) packet on a particular data channel (which is resolved during signaling) and if the destinations (which are also tuned to the same channel for the successful reception of RTS packet) hear these packets, they respond with a clear-to-send (CTS) packet on the same channel. It should be noted that this handshake is carried out across all the channels by all the nodes simultaneously, which is different than that of the RTS-CTS exchange used in IEEE 802.11 MAC [1]. Rather than preempting other contenders, RTS and CTS packets are sent simultaneously.

Figure 3:
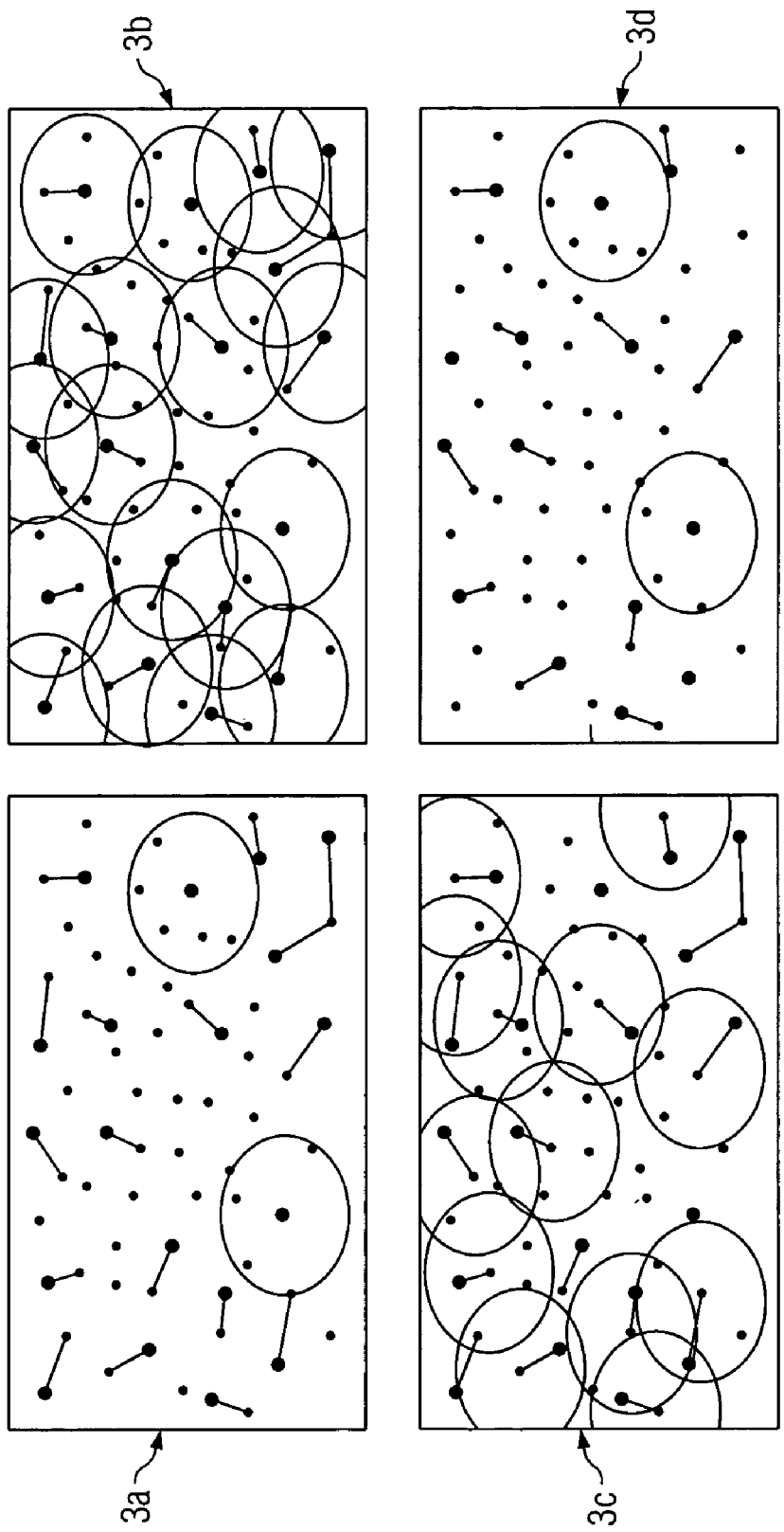
FIG. 3 shows an example of the RTS-CTS handshake finalizing the set of nodes to exchange packets.

The panels of FIG. 3 illustrate the process. In panel 3a, the large nodes are the signaling survivors. The lines are drawn from the signaling survivors to the destinations to which they want to send packets. Circles are drawn around nodes that are broadcasting a packet. Panel 3b reveals those nodes that transmit RTS packets. The large circles are the ranges of their RTS transmissions. If a destination receives a RTS packet, it responds with a CTS packet, see panel 3c. These CTS packets are also sent simultaneously. Note that the recipients of RTS packets for broadcasts do not respond. Data channel 1 is used for broadcast purposes, as described in detail below. For the broadcast purposes, no CTS packet is sent, as the source would not be able to distinguish CTS packets from multiple destinations. Next, if contenders receive a CTS packet, they become contention winners and transmit their PDU's. Finally, destinations respond to successfully received PDU's with an acknowledgement (ACK). From the perspective of both the contention winners and their destinations, interference conditions can only get better through the deferrals that result from the RTS-CTS exchanges since PDUs and ACKs are transmitted with equal or lower power than that used for RTS-CTS exchanges. As a result, contention winners should also be successful in exchanging their PDUs. The MTSCR orchestrates the above-described process on all the data channels. The result of this protocol is a high density of nodes that can exchange PDUs simultaneously within a transmission range.

Figure 4:
FIG. 4 illustrates different phases of MTSCR signaling.

The protocol includes three phases. Each phase includes multiple time slots. In some embodiments, the protocol is optimized for a maximum of 250 contenders and there are 12 data channels. FIG. 4 shows different phases of MTSCR signaling including the number of time slots that each phase needs to complete signaling.

Each communication node maintains a data structure such as described below, which is initialized before the start of MTSCR signaling.

Struct node_data{

Int node_state; /* this variable can take one of the three values, viz. NODE_STATE_TX, NODE_STATE_RX, NODE_STATE_IDLE. This variable defines the state of node during MTSCR signaling. */

Int node_id; /* this variable indicates the unique MAC address of this node. The length of this address is 16 bits*/

Bool recvd_codes [50]; /*This structure describes which of the tones are received in the current time slot.*/

Bool recvd_node_id[16] [201]/*This structure holds the 16 bit receiver address which is signaled during phase 2 signaling */

Int selected_rx; /* This variable holds the receiver MAC address which is the intended destination. This field has significance only with transmitter node. If the transmitter has not learnt the receiver address, then it uses 0xffff as a broadcast address. This field has a maximum length of 16 bits. */

Int tx_selected_code; /*This variable stores the code that was transmitted during phase 2 signaling of receiver address*/

Int phase_1_target_node_density; /*All nodes with state NODE_STATE_TX will set this variable to appropriate value during phase 1 signaling. This variable signifies the survivor density of transmitters per radio range at then end of phase 1 signaling. */

/*The following array stores an estimate of the number of nodes participating in signaling. */

Int nr_tx_array[50]={1,2,3,4,5,6,7,8,9,10,11,12,13,15,16, 17,18,19,20,21,23,24,26,27, 30,51,54,56,58,60,62,64,66,68, 70,72,74,76,78,80,82,84,87,89,92,96, 102,110,131,196};

Int data_channel; /*This variable stores the channel number for transmitting RTS/CTS/DATA/ACK packets. The value of this variable ranges from 1 to 12 as there are 12 data channels. This variable is computed during phase 2 signaling. */

};

Each communication node can be in any of these three states:—

NODE_STATE_TX signifies that current node is in transmitting state.

NODE_STATE_RX signifies that current node is in receiving state.

NODE_STATE_IDLE signifies that current node is in sleep state and is not at all participating in signaling any more. These nodes will not send or receive RTS/CTS/DATA/ACK packets.

Before entering the signaling, all nodes which have data to transmit set their state to "NODE_STATE_TX", while all the rest of the nodes set their state to "NODE_STATE _RX".

Protocol Description for Phase 1 Signaling

Note, that 50 distinct tones are used for phase 1 signaling in some embodiments.

All tones in phase 1 signaling are numbered from 0 to 49. The underlying concept of phase 1 signaling is to estimate the contender density and then arrive at a subset of nodes that can then transmit a receiver address during phase 2 signaling. This subset is identified within the four time slots of phase 1, and the surviving nodes from phase 1 then participate in the MTSCR signaling of phase 2.

Algorithm for Time Slot 1 of Phase 1

In this time slot, all nodes with state "NODE_STATE_TX" select a tone at random and transmit, whereas all nodes with state "NODE_STATE_RX" count the number of tones that they hear in this time slot. The pseudo code below describes the algorithm used by nodes in time slot 1 of phase 1.

```
If (node_state == NODE_STATE_TX)
  {
  Select any tone at random and transmit.
  }
Else if (node_state == NODE_STATE_RX)
  {
  /*Node hears and detects the tones that are transmitted and
sets a corresponding
    entry in array recvd_code[ ] to TRUE. For example, if node
hears tone 7 then it
    sets recvd_code[7] to TRUE. */
  Count=0;
  for(I=0;I<50;I++)
    if (recvd_code[I]==TRUE)
      count++;
    /*flush receive buffer so as to receive the tones in
next time slot. */
  for (I=0;I<50;I++)
    recvd_code[I]=FALSE;
  }
```

Algorithm for Time Slot 2 of Phase 1

In this time slot, all nodes with state "NODE_STATE_RX" transmit a tone numbered "count −1", if it hears "count" tones. For example, if node hears "34" tones in time slot 1 of phase 1, then it transmits tone "33" in current time slot. Note, that a node can hear a maximum of 50 tones in a given time slot as phase 1 signaling is done on only 50 tones.

All nodes with state "NODE_STATE_TX" listen to all the tones and estimate the number of nodes, which participated in time slot 1 of phase 1 signaling. These nodes then calculate back off probability, and then change their state to "NODE_STATE_RX" to achieve a desired contender density at the end of phase 1 signaling. The pseudo code below describes the algorithm used by nodes in time slot 2 of phase 1.

```
1f (node_state == NODE_STATE_RX)
  {
  transmit tone numbered "count −1 " calculated from previous
time slot.
  /*For example, if node hears 35 tones then it transmits
tone 34 in current time
    slot. */
  }
else if(node_state==NODE_STATE_TX)
  {
  /*Node hears and detects the tones that are transmitted and
sets a corresponding
    entry in array recvd_code[ ] to TRUE. For example, if node
hears tone 7 then it
    sets recvd_code[7] to TRUE; */
  count=0;
  for(I=0;i<50;I++)
    if(recvd_code[I]==TRUE) count=I+1;
  /*This estimates the number of nodes that were in state
"NODE_STATE_TX" in
    previous cycle.*/
  If (count) nr_tx=nr_tx_array[count];
  Else nr_tx=0;
  /*all nodes calculate phase_1_target_node_density which is
the node density that
    is to be achieved after phase 1 signaling.*/
  if(nr_tx)
    {
    if(nr_tx<130)
      phase_1_target_node_density = nr_tx / 2;
    else
      nr_tx=65;
    /*calculate backoff probability to revert from
NODE_STATE_TX to
      NODE_STATE_RX state*/
    if (nr_tx>phase_1_target_node_density)
      {
      p_backoff=(nr_tx−
      phase_1_target_node_density)/nr_tx;
      /*random( ) function returns a random number generated
between 0 and 1*/
      /*Change state to "NODE_STATE_RX" according to backoff
probability,
        p_backoff so as to reach at contender density
specified by the
        "phase_1_target_node_density" at the end of phase 1
signaling. */
      if(p_backoff >random( ))
        set node_state=NODE_STATE_RX;
      }
    }
  else
    {
    /*nr_tx = 0 means that all nodes in the region are
contenders. Hence,
      backoff with 50% probability.*/
    If(0.5<random( ))
      Set node_state=NODE_STATE_RX;
    }
  /*flush receive buffer so as to receive the tones in next
time slot.*/
  for(I=0;I<50;I++)
    recvd_code[I]=FALSE;
  }
```

Algorithm for Time Slot 3 for Phase 1

All nodes with state "NODE_STATE_TX" transmit the randomly selected tone from set of 50 tones. All nodes with "NODE_STATE _RX" count the number of tones that they hear in current time slot and echo back this result in time slot 4 in phase 1 signaling. The pseudo code below describes the algorithm used by the nodes in time slot 3 of phase 1.

```
If(node_state==NODE_STATE_TX)
  {
  select a tone at random and transmit;
  }
Else if (node_state == NODE_STATE_RX)
```

-continued

```
{
  /*Node hears and detects the tones that are transmitted and
  sets a corresponding entry in array recvd_code[ ] to TRUE. For
  example, if node hears tone 7 then it
    sets recvd_code[7] to TRUE. */
  Count=0;
  for(I=0;I<50;I++)
    if (recvd_code[I]==TRUE)
      count++;
  /*flush receive buffer*/
  for(I=0;I<50;I++)
    recvd_code[I]=FALSE;
}
```

Algorithm for Time Slot 4 of Phase 1

All nodes with state "NODE_STATE_RX" transmit tone numbered "count −1", where "count" is calculated from time slot 3 of phase 1 signaling. All nodes with state "NODE_STATE_TX" listen to all the tones and estimate the number of nodes, which participated in time slot 3 of phase 1 signaling. These nodes then calculate back off probability to achieve a desired contender density at the end of phase 1 signaling. The following pseudo code describes the algorithm used by nodes in time slot 4 of phase 1.

```
If(node_state==NODE_STATE_RX)
  {
    transmit tone numbered "count−1" calculated from previous
    time slot.
  }
else if (node_state==NODE_STATE_TX)
  {
    count=0;
    for(I=0;i<50;I++)
      if(recvd_code[I]==TRUE) count=I+1;
    nr_tx= nr_tx_array[count];
    if(phase_1_target_node_density==0)
      {
        if(2*nr_tx>130)
          phase_1_target_node_density = 65;
        else
          phase_1_target_node_density=nr_tx;
      }
    if(nr_tx>phase_1_target_node_density)
      {
        p_backoff=(nr_tx−
phase_1_target_node_density)/nr_tx;
        if(p_backoff>random( ))
          {
            node_state=NODE_STATE_RX;
          }
      }
  }
```

This will complete signaling of phase 1. Hence, at the end of phase 1, there should be no more than 65 contenders per transmission range.

Phase 2 Signaling

In some embodiments, there are 201 tones available in phase 2 signaling and these are numbered from 0 to 200. In phase 2, all nodes in state "NODE_STATE_TX" send receiver address on a randomly selected code (from 0 to 99). Any node that selects code "i" is assigned tone "2*i and 2*i+1" for signaling purposes.

The last tone numbered "200" is used to signal broadcast address, which is used when a node in state "NODE_STATE_TX" has no information about the MAC address of the intended destination. Consider for example, a node selects code "3", then it can use only tones numbered "6" and "7" for signaling receiver address. Hence, in each time slot of phase 2, each node uses two tones for signaling receiver address. These two tones represent two bits of receiver address. The first time slot of phase 2 contains two last significant bits of receiver ID, then second time slot contains next 2 bits of receiver ID, and finally, the eighth time slot contains last 2 most significant bits of receiver ID. If a node is not aware of the receiver MAC address with which to communicate, then it transmits tone numbered "200" to signal the use of broadcast channel.

Bits to Tone Assignment

The following assignment specifies rules for transmitting tones to signal the receiver bits in a given time slot. Consider, any node has been assigned tones "a" and "b" for signaling in phase 2, then the assignment rules are as defined below. Table 2 describes the assignment of bits to the transmitted tones.

TABLE 2

Description of bits assignment to transmitted tone

| Bits | Tone transmitted |
| --- | --- |
| 00 | none |
| 01 | a |
| 10 | b |
| 11 | a, b |

Hence, to transmit bits "11" in any time slot, a node has to transmit both tones "a" and "b" for signaling, and so on.

Algorithm for First 8 Time Slots of Phase 2 Signaling

In the next 8 time slots, all nodes with state "NODE_STATE_TX" transmit the receiver MAC address on the assigned frequency tones, whereas all nodes in state "NODE_STATE_RX" decode the receiver address, which they receive on different tones. Note, that all nodes in state "NODE_STATE_RX" has to decode the information present on all the tones. The pseudo code below describes the algorithm used by nodes in the first 8 time slots of phase 2 signaling.

```
If (node_state == NODE_STATE_TX)
  {
    /*selected_rx contains the MAC address of the
    destination node.*/
      if (selected_rx==0xffff)
      {
      /*this means that transmitter node does not know about
destination address*/
      /*In this case all nodes go on to hear broadcast channel.
*/
        data_channel = 1;
        /*we are using data channel 1 as a broadcast
channel.*/
        Transmit tone numbered 201 to signal the use of
broadcast channel.
      }
      else
      {
      /*select a code to transmit from 0 to 99*/
      tx_selected_code=99 * random( );
      select tones numbered "tx_selected_code*2" and
"tx_selected_code*2+1"
      and transmit receiver MAC address in the next 8 time
slots."
      /*The following code assigns the data channel to exchange
RTS/CTS/DATA/ACK packets. Hence, we do not need full duplex
receiver to listen on all the channels. */
      For(I=1;I<=12;I++)
        If ((tx_selected_code >=(I−
```

-continued

```
1)*100/12)&&(tx_selected_code <I*100/12))
        Data_channel =I;
    }
else
    if(node_state == NODE_STATE_RX)
    {
        decode all the tones transmitted on the first 8 time
slots and identify own
            MAC address
    }
```

Algorithm for Last Time Slot of Phase 2 Signaling

In this time slot, all intended receivers should identify themselves from the signaling from first 8 time slots of phase 2. Hence, all nodes with state "NODE_STATE_RX" decode the received tones from first 8 time slots. Then, if any of the signaled receiver MAC addresses that are signaled in first 8 time slots in phase 2 matches with its own MAC address then it sets its data channel to appropriate value depending on the tone on which it received its MAC address and also signals the same tone in the current time slot. This data channel is used after phase 3 signaling to exchange RTS/CTS/DATA/ACK packets. If the receiver node does not detect its own MAC address, then it sets its state to "NODE_STATE_IDLE" and does not participate in signaling any further.

All nodes with state "NODE_STATE_TX" listen to the tone, which they used for signaling the receiver address. If they hear their tone back in the current time slot, then this signifies that corresponding receiver node has been identified and continues in phase 3 signaling, otherwise these nodes set their state to "NODE_STATE_IDLE" and does not participate in signaling any further. The following pseudo code describes the algorithm used by the ninth or last time slot for signaling.

```
If (node_state==NODE_STATE_RX)
{
    /*This variable indicates whether there is a need
for broadcast on the channel. */
    check_for_broadcast_node_address=FALSE;
    for(I=0;I<16;I++)
    if(recvd_node_id[I][201]==TRUE)
        check_for_broadcast_node_address= TRUE;
    if(check_for_broadcast_node_address==TRUE)
    {
        /*listen to broadcast channel. */
        set data_channel=1;
        transmit tone numbered "201" in this time slot;
    }
    else
    {
        decode the received node addresses in array
recvd_node_id[ ][ ]
        if node_id is signaled in received_node_id
        {
            set tx_selected_code= tones on which the
            receiver address is signaled.
        /*Algorithm to assign data channel to exchange
RTS/CTS/DATA/ACK packets. */
        For(I=1;I<=12;I++)
            If ((tx_selected_code >=(I-
1)*100/12)&&(tx_selected_code <I*100/12))
                Data_channel =I;
        Transmit the tone in this time slot of phase 2
        signaling.
        }
        else
            set node_state = NODE_STATE_IDLE;
        /*hence all the nodes whose address is not
```

-continued

```
detected in phase 2
        signaling go into "NODE_STATE_IDLE" mode*/
        }
    }
    Else if (node_state == NODE_STATE_TX)
    {
        /*Node hears and detects the tones that are transmitted and
        sets a corresponding
        entry in array recvd_node_id[0][ ] to TRUE. For example, if
        node hears tone 7 then it sets recvd_node_id[0][7] to TRUE.
        */
        If (recvd_node_id [0][201]==TRUE)
        {
            /*This means that some node wants to use
broadcast channel.
            Hence, all nodes lock on to broadcast channel. */
            Data_channel =1;
            /*we are using data channel 1 as broadcast
channel. */
        }
        else
        {
            if(recvd_node_id[0][tx_selected_code]==FALSE)
            {
                /*This node has lost contention. */
                Set node_state= NODE_STATE_IDLE;
            }
        }
    }
}
```

Algorithm for Phase 3 Signaling

The phase 3 signaling is done only by the nodes in state "NODE_STATE_TX" to thin out contenders across each data channel and it happens for all the data channels simultaneously. For example, all nodes on data channel 1, which have their state as "NODE_STATE_TX" participate in signaling on frequency tone 1, whereas all nodes on data channel 2 having their state as "NODE_STATE _TX" participate in signaling on frequency tone 2 and so on. All the nodes that lose contention during MTSCR signaling set their state to "NODE_STATE_IDLE" and do not participate in the signaling any further. In some embodiments, the signaling mechanism for phase 3 operates according to the Synchronous collision resolution (SCR described in [13]. The 4 slot design from [13] is shown in Table 3 for 50 nodes and with a target density ($k_t$). Here, $p^x$ denotes the signaling probability in time slot x of phase 3 signaling.

TABLE 3

Signaling probabilities used in given time slot in phase 3 signaling

| Design parameters Number of slots | Target density, $k_t$ | Signaling probabilities, $p^x$ | | | |
|---|---|---|---|---|---|
| | | 1 | 2 | 3 | 4 |
| 4 | 50 | 0.06 | 0.27 | 0.35 | 0.41 |

At the end of phase 3 signaling all nodes either in state "NODE_STATE _TX" or "NODE_STATE_RX" know the data channel on which to exchange RTS/CTS/DATA/ACK packets. All nodes with state "NODE_STATE_TX" send RTS packets simultaneously. Then, all nodes with state "NODE_ STATE_RX" send CTS packets only if they are intended destinations. Hence, all contenders that receive CTS packets are contention winners and send their DATA packets (PDUs).

Finally, a destination responds with ACK packet if DATA packet is received and decoded without errors. Note, that the above exchange of RTS/CTS/DATA/ACK packets occur simultaneously across all the data channels.

Calculations for nr_tx_array[ ]

As described above, this array provides an estimate of the number of nodes participating in signaling given the number of tones heard in the given time slot. Assume each node selects a tone from (0 to 49) at random and transmits. Let there be "n" nodes in a given transmission range.

As shown below, "x" denotes the average number of tones that "n" nodes select for transmission and "k" is the maximum number of tones available for signaling phase 1 (which in this case is 50). The values for nr_tx_array[ ] (for example those shown above) are taken from calculated values of "x", where "n" ranges from 1 to 200.

$$x \begin{cases} \dfrac{\sum_{j=1}^{k} j\,{}^nC_j}{\sum_{j=1}^{k} {}^nC_j} & k <= n, \\[2ex] \dfrac{\sum_{j=1}^{n} j\,{}^kC_j}{\sum_{j=1}^{n} {}^kC_j} & k > n. \end{cases}$$

MTSCR requires that nodes should be synchronized; and in fact synchronized contentions and transmissions are two basic keys for its operation. Any reasonable level of synchronization will be enough to make the protocol work. The purpose of the synchronization is to prevent ambiguity in identifying signaling slots in which the signals are sent. Appendix A in [13] illustrates one of many known ways that signaling slots can be sized to prevent ambiguity. Synchronization can be provided by an external source or can be generated internally. One of the possible external sources is the Global Positioning System (GPS). GPS provides a worldwide synchronization to a resolution of approximately 250 ns [18]. Considering that the time for a signal to propagate 300 meters is four times that value, synchronization would have only a small impact on the slot size. Other possible external sources for synchronization include position location awareness systems like the U.S. Army's Enhanced Position Location Reporting System (EPLRS) or ultra wideband (UWB) radios. Both have timing resolution of at least 1 ms. In the case of UWB, manufacturers claim a resolution in the range of tens of picoseconds [19]. If the network operates in an environment where any one of these sources can be considered reliable, synchronization becomes the lesser issue in the sizing of signaling slots as compared to propagation times and transceiver transition times.

FIG. 1 shows an overview of MTSCR signaling. The radio channel is divided up into sequential transmission slots and then each transmission slot is broken up into a series of signals followed by the transmission of a protocol data unit (PDU). All the nodes in MTSCR signaling are synchronized and participate in the signaling simultaneously.

FIG. 2 shows an example of MTSCR signaling on each data channel. MTSCR actually orchestrates the similar geometry of survivors across all the data channels. All nodes start off as contenders in Panel 2*a*. Then, through a series of signals, two sets of which are illustrated in panels 2*b* and 2*c*, a final subset of contenders is selected in panel 2*d*. The large dots are nodes that view themselves as contenders, the small dots are nodes that view themselves as having lost the contention, and the large circles represent the range of the signals.

FIG. 3 shows an example of the RTS-CTS handshake, which is used by the nodes that survived through the MTSCR signaling. These surviving nodes resolve the data channel used for RTS/CTS handshake during signaling thus avoiding the use of full duplex transreceiver. RTS/CTS handshake actually finalizes the set of nodes, which can exchange DATA packets simultaneously. Panel 3*a* illustrates the set of contenders that survived signaling across each data channel and their intended destination (circles indicated intended broadcasts). Panel 3*b* illustrates the contenders' simultaneous RTS transmissions. Panel 3*c* illustrates the destinations' simultaneous response of CTS packets. Panel 3*d* illustrates the winners of the contention. All source nodes that successfully receive CTS packets from their destination nodes then transmit DATA packets on the same channel that was used for exchanging RTS/CTS packets.

FIG. 4 illustrates different phases involved in MTSCR signaling. Phase 1 comprises 4 time slots and it involves the estimation of contender density. The algorithm of phase 1 reduces the initial contender density to a set of nodes which will participate in phase 2 signaling. All the nodes that lose contention in phase 1 do not participate in signaling or exchange of packets. All the nodes that survive phase 1 signaling transmit a receiver MAC address during phase 2 in order to identify potential destinations. Phase 2 signaling also helps source/destination pairs learn information regarding the data channel to use for the exchange of RTS/CTS/DATA/ACK packets. Phase 2 takes 8 time slots and identifies the potential source/destination pairs and their corresponding data channels. All the source nodes contend in phase 3 signaling simultaneously across all the data channels using (in some embodiments) Synchronous Collision Resolution (SCR) in order to reduce the contender density across each data channel. Each destination node listens to CTS packets on the assigned data channel that was resolved during phase 2 signaling. All contending source nodes that survive phase 3 signaling transmit RTS packets simultaneously on the assigned data channel. The signaling of RTS/CTS finalizes the set of nodes that can exchange DATA/ACK packets simultaneously.

Figure 5:
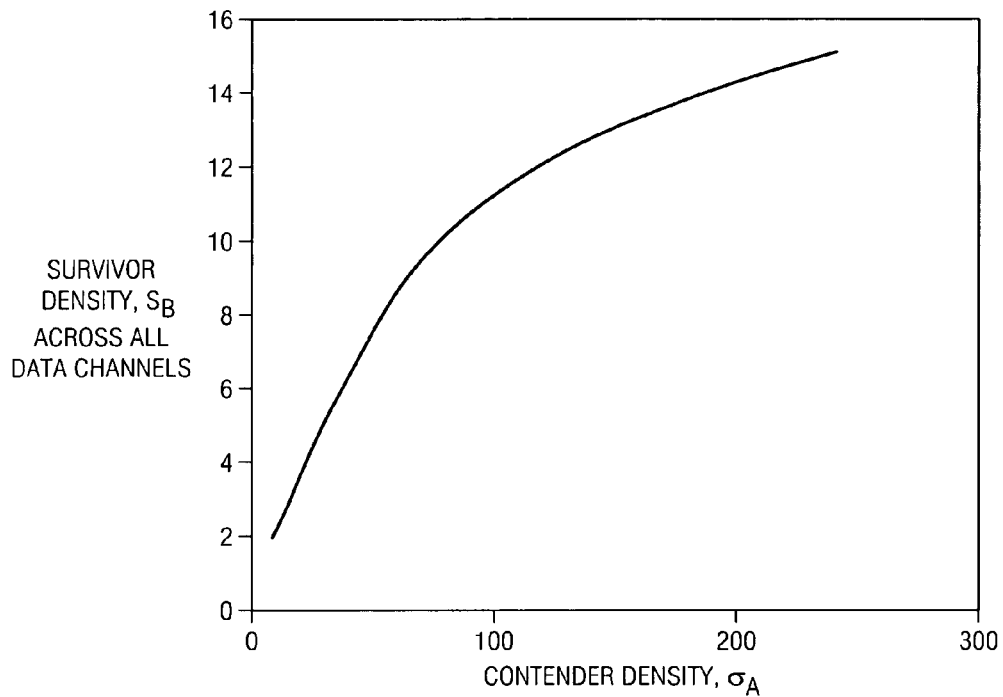
FIG. 5 illustrates the survivor density distribution versus contender density after MTSCR signaling.

FIG. 5 illustrates the survivor densities that MTSCR orchestrates across all the data channels, and the capability of MTSCR to reuse multiple data channels, which results in increased throughput at the MAC layer.

Figure 6A:
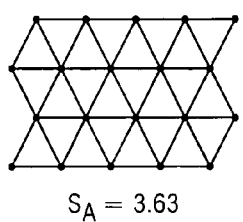
FIG. 6a illustrates the ideal survivor density configuration.
Figure 6B:
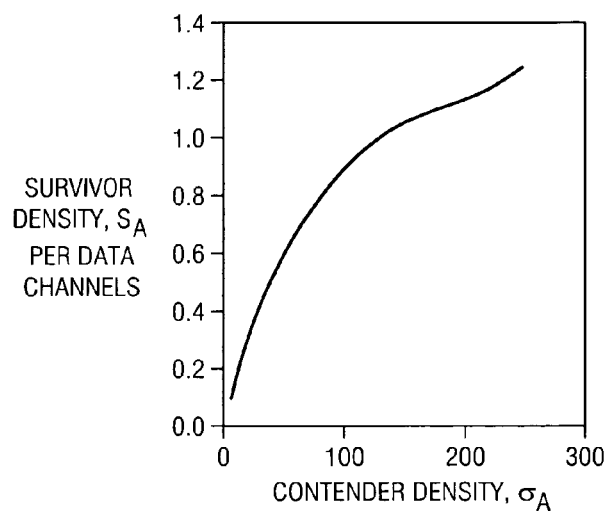
FIG. 6b illustrates the survivor densities per data channel of nodes after MTSCR signaling.

FIG. 6*b* shows the survivor density per data channel versus the number of contenders, and the capability of MTSCR to orchestrate high spatial reuse across each data channel.

Figures 7, 8, 10:
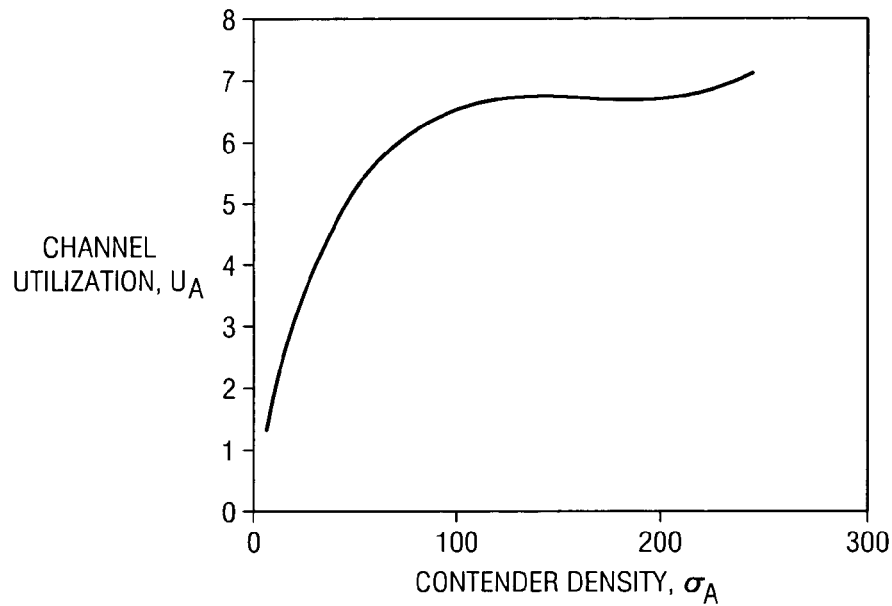
FIG. 7 shows channel utilization versus contender density.
FIG. 8 illustrates exemplary MTSCR operations during time slot 1 of phase 1.
FIG. 10 illustrates exemplary MTSCR operations during time slot 3 of phase 1.

FIG. 7 illustrates the channel utilization as a function of contender node density. FIG. 7 demonstrates the number of nodes that can successfully exchange data packets across all the data channels. The routing strategy used here is normal routing, in which each node selects the shortest path as a criterion for selecting the best route. FIG. 7 clearly illustrates the capability of the protocol in terms of congestion collapse at the MAC layer. We can see that protocol enables the use of a wireless channel close to its maximum utilization without any congestion at the MAC layer. This result is in contrast with CSMA-based protocols in which MAC layer throughput decreases with the increase in the number of contenders that the CSMA protocol is designed to handle.

Figure 9:
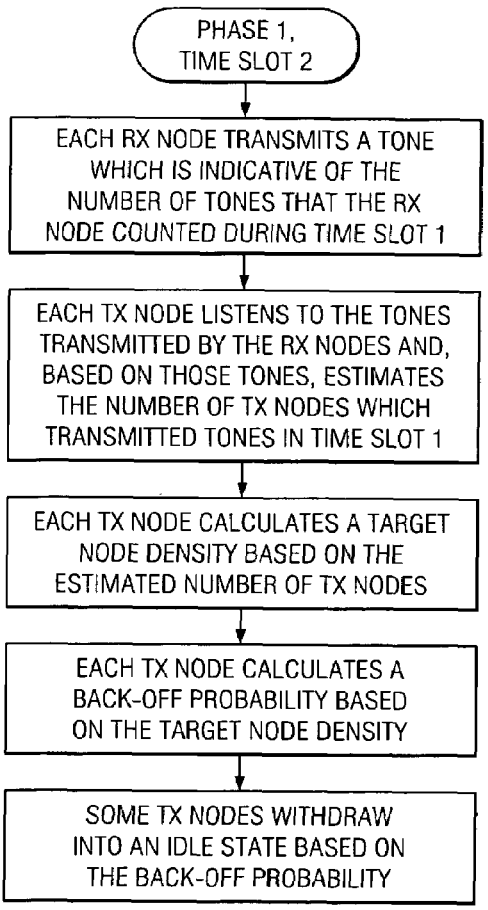
FIG. 9 illustrates exemplary MTSCR operations during time slot 2 of phase 1.

FIG. 8 generally summarizes the phase 1, time slot 1 operations described in detail above. FIG. 9 generally summarizes the phase 1, time slot 2 operations described in detail above.

Figure 11:
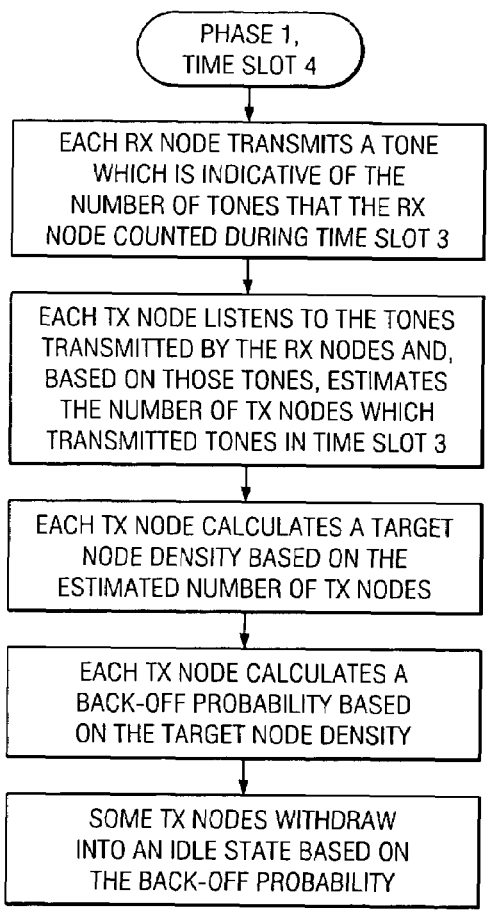
FIG. 11 illustrates exemplary MTSCR operations during time slot 4 of phase 1.

FIG. 10 generally summarizes the phase 1, time slot 3 operations described in detail above. FIG. 11 generally summarizes the phase 1, time slot 4 operations described in detail above.

Figure 12:
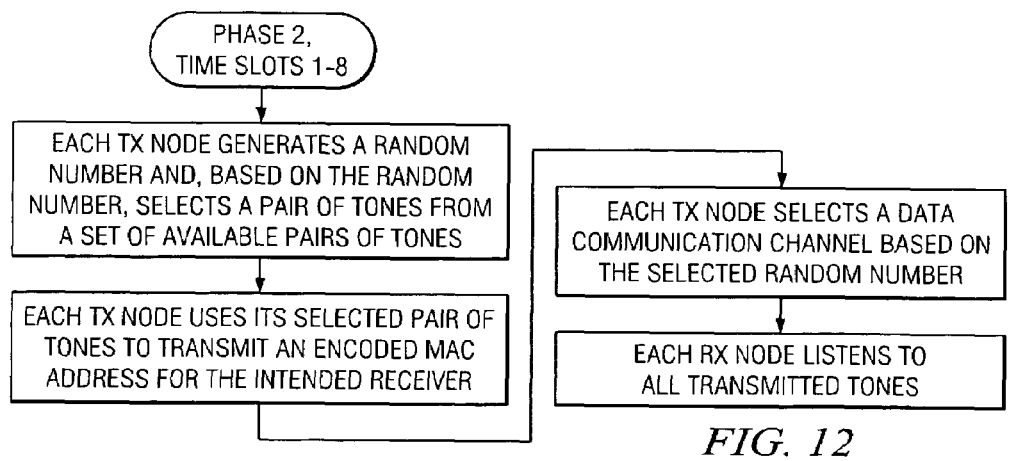
FIG. 12 illustrates exemplary MTSCR operations during time slots 1-8 of phase 2.
Figure 13:
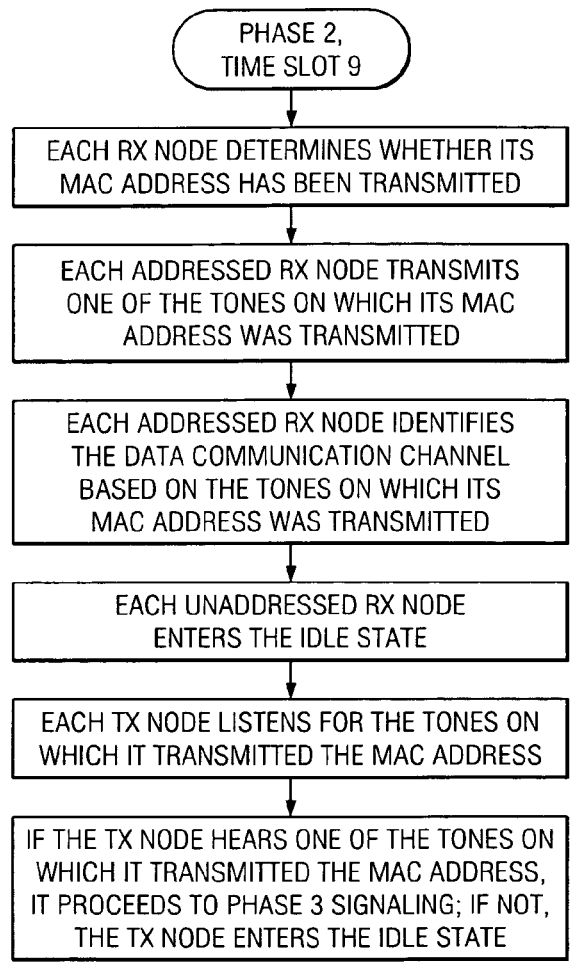
FIG. 13 illustrates exemplary MTSCR operations during time slot 9 of phase 2.

FIG. 12 generally summarizes the phase 2, time slots 1-8 operations described in detail above. FIG. 13 generally summarizes the phase 2, time slot 9 operations described in detail above.

Figure 14:
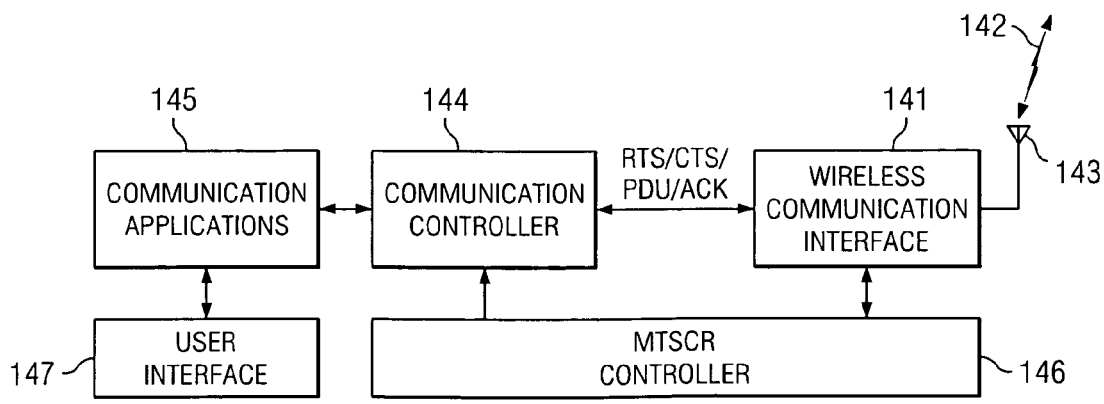
FIG. 14 diagrammatically illustrates exemplary embodiments of a communication node according to the invention.

FIG. 14 diagrammatically illustrates exemplary embodiments of a communication node (such as those shown in FIGS. 2 and 3) according to the invention. A wireless communication interface 141 supports bidirectional wireless communication over an air interface 142 via an antenna arrangement 143. A communication controller 144 interfaces between the wireless communication interface 141 and communication applications 145. The communication applications 145 are accessible to a user via a user interface 147 which can include, for example, any one or any combination of a tactile interface, a visual interface and an audio interface. The communication controller 144 is capable of producing and receiving the aforementioned RTS, CTS, PDU and ACK packets. The PDU packets include actual payload data associated with the operations of the communication applications 145. An MTSCR controller 146 is coupled to the wireless communication interface 141 and the communication controller 144. The MTSCR controller 146 is cooperable with the wireless communication interface 141 for supporting the above-described operations of phases 1, 2 and 3. The MTSCR controller 146 also selectively enables the communication controller 144 to begin the RTS/CTS/PDU/ACK packet communication process. In various embodiments, the MTSCR controller 146 supports various ones of the exemplary MTSCR operations described in detail above. A plurality of the FIG. 14 communication nodes (such as shown in FIGS. 2 and 3) can thus be seen to cooperate collectively to define a contention resolution system distributed across the MANET, and capable of performing the MTSCR operations described above relative to FIGS. 1-13.

Referring again to FIGS. 1 and 4, if desired, some embodiments can proceed to the RTS transmission immediately after phase 2.

The effectiveness of MTSCR can be demonstrated in terms of its ability to utilize multiple data channels, resolve contentions, and achieve spatial reuse, and in terms of its operation in congested environment and its capability in providing fair access.

In a simulation, the simulation environment was a square, 10 units on a side. A single unit corresponds to the maximum range of a radio. The parameters of our simulation include the parameters of MTSCR protocol, number of data channels and density of nodes, $\sigma_A$. Node density $\sigma_A$, is the average number of nodes in an area covered by a node's transmission, $\pi$ units$^2$ since the radio's range is 1 unit. All nodes in a network contend according to MTSCR signaling. All simulation results are based on twenty 1000-transmission-slot simulation runs where each simulation uses a different random node placement. It is assumed that interference range and transmission range of nodes are equal and the routing strategy used is normal routing, in which any node selects any other node at random as a destination within its transmission range. The normal routing strategy uses least number of hops as the selection criteria for choosing the best route.

One useful criterion to evaluate the effectiveness of the MTSCR mechanism is the density of surviving nodes per transmission range across all channels. The density of surviving nodes, $S_B$, can be measured as the average number of surviving contenders per transmission area across all channels after MTSCR signaling. Another parameter, $S_A$, is the average density of survivor nodes per data channel per transmission area.

FIG. 5 illustrates the survivor densities $S_B$ across all data channels after MTSCR signaling. It can be seen that MTSCR uses multiple channels to orchestrate both channel reuse and spatial reuse within a transmission range and this results in high survivor densities within a transmission range.

FIGS. 6a and 6b illustrate the results of simulation versus the best one could achieve. FIG. 6a exhibits the distribution that maximizes the density of survivors per data channel per transmission range assuming all survivors are at least one unit from each other [21]. This distribution corresponds to placing survivors on a triangular tessellation and gives a survivor density of $S_A=3.63$. FIG. 6b illustrates the average survivor densities for various contender densities when using MTSCR signaling. Lower contender densities have lower survivor densities. There are two reasons that the $S_A=3.63$ density is never reached; the survivors are separated by more than 1 unit and the physical layout of survivors is something less efficient than the triangular tessellation. The range of signals and density of contenders can affect survivor density but is unlikely to achieve a perfect layout of survivors.

As demonstrated above, MTSCR is very robust and can be designed to remain so for any density of contenders. When SCR is used in phase 3 signaling, the protocol is very robust in issues involving spatial capacity. As also demonstrated above, the protocol is stable and does not suffer congestion collapse.

MTSCR signaling is fair. It has no memory and does not suffer from problems of back-off strategies used in CSMA protocols, which are unstable and give preference to some nodes. But, MTSCR signaling can be designed, in some embodiments, to give preference to some nodes and implement MAC layer QOS algorithms. Since access attempts are simultaneous, the perpetual deferrals that may occur with exposed nodes will never occur. Since the MTSCR signaling is a separate process from the exchange of packets, power level can be used to select the separation distance between contenders, thus creating more optimum conditions for packet exchanges. Any technique that improves capture will improve capacity, making this protocol complementary to physical layers that use directional antennas.

MTSCR also does not suffer from the hidden terminal problem in which there are subsets of contenders that may block each other at a common destination. Blocking occurs when two contenders gain access to the channel and attempt to send a packet to the same destination. Because of the nature of MTSCR signaling, it is highly unlikely that different transmitter nodes select the same tone to transmit their receiver addresses during phase 2 signaling.

The concept of MTSCR estimating the number of contenders within a transmission range and then arriving at a subset of source/destination pairs so as to increase channel utilization can also be used by routing protocols to estimate traffic flow at the MAC layer, and this information can also be used in routing protocols that use multiple routes and balance the load across the network. Also, the information provided by the MAC layer regarding the number of contenders can be used to provide QOS at the MAC layer, and to estimate traffic at the MAC layer. Exemplary embodiments provide a framework for cross layer optimizations between the MAC layer and the routing layer. The routing protocol can be made much more robust by using information (such as number of contenders) provided by the MAC layer as a result of MTSCR signaling.

Turning now to tone detection, assume that there is no multipath fading or shadowing effect, these issues having been resolved for example, by diversity techniques at the physical layer Assume that frequency tone energy is much higher (+10-20 dB) compared to the background noise. Because of signal energy and computational complexity, second harmonics of tone are not considered. First harmonics are assumed to be sufficient for the proper detection.

For calculation purposes, assume for example that the transmission range of the system is 50 m and the bandwidth available for signaling is 20 MHz, which is the bandwidth occupied by single data channel in IEEE 802.11a spectrum. Continuing with the foregoing examples, assume that there are 50 tones in phase 1 signaling, and 200 tones in phase 2 signaling.

Some embodiments use the Goertzel algorithm for the detection of tones, which involves FFT computation of received samples. Assume an available signaling bandwidth, fm=20 MHz, and a sampling frequency fs=40 MHz.

Table 4 shows an exemplary frequency band (3-15 MHz) for the frequency assignment of tones. Leaving 5 MHz at the higher end of spectrum helps to remove aliasing problems.

TABLE 4

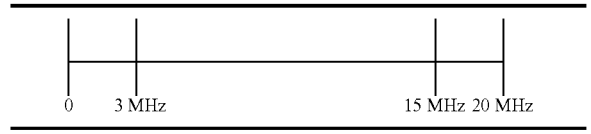

Frequency spacing in phase 1=12 MHz/50=240 kHz (because 50 tones are used). Frequency spacing in phase 2=12 MHz/200=60 kHz (because 200 tones are used). Assume a tolerance limit=±5 kHz.

Some embodiments store 200 FFT coefficients, which are computed by 1024 DFT coefficients.

If the received signal is sensed for x μs, this means a node transmits an assertion signal for no more than x μs.

Since, the sampling frequency, fs=40 MHz, the number of samples received in x μs is 40x samples. The Goertzel algorithm needs 2 cycles of a typical DSP processor for tone processing computation, hence the number of cycles needed for single tone detection=(40x)* (2) cycles=80x cycles. For 200 tones, the number of cycles needed=200*80x cycles=16000x cycles. Assume that the processing of the sensed signal takes y μs. The MIPS requirement of a typical DSP processor in phase 2 signaling is 16000 x/y MIPS, and the MIPS requirement in phase 1 signaling is 4000 x/y MIPS.

For phase 1 signaling in some embodiments:
x=y=2 μs;
MIPS requirement of phase 1 signaling=4000 MIPS; and the slot timing of phase 1 signaling=x+y=4 μs.

For phase 2 signaling in some embodiments:
x=1 μs; and y=3 μs
MIPS requirement for phase 2 signaling=5333 MIPS; and the slot timing of phase 2 signaling=x+y=4 μs.

Exemplary embodiments of the invention thus provide a novel multi-channel medium access protocol called Multi-tone Synchronous Collision Resolution (MTSCR). The protocol assumes that nodes in the network are synchronized. Thus, nodes with data to send can contend simultaneously for the channel. Nodes contend for access using a synchronous signaling mechanism that uses multiple tones in a synchronous manner to resolve contentions. This protocol arbitrates contentions locally and selects a subset of nodes across the network, which attempt to transmit data packets simultaneously across all the available data channels. The IEEE 802.11 standard provides multiple channels for use, but its MAC protocol is designed for only a single channel and also suffers from congestion collapse. The MTSCR protocol first estimates the number of contenders using synchronous signaling of frequency tones, then arrives at a subset of contenders that can signal receiver MAC address. After that, MTSCR distributes these source/destination pairs uniformly across all the available data channels. The subset of nodes that survive the signaling mechanism can be viewed as an orchestrated set of transmissions that are spatially reusing the channel shared by the nodes. The MTSCR protocol uses multiple channels but does not suffer from congestion collapse. The channel reuse and spatial capacity aspects of a MAC protocol are addressed, as is critical for ad hoc networking.

MTSCR does not suffer from hidden or exposed node effects, achieves high capacities with a spatial usage exceeding 1 (i.e. more than one packet exchange in the area covered by a transmission), and facilitates the integration of new physical layer capacity increasing technologies. Additionally, MTSCR also provides information on the contender density to the higher layers, which can be very useful for designing routing, and MAC layer QOS algorithms as contender density can be used to estimate the traffic at the MAC layer.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of operating a mobile ad hoc network (MANET) that includes a set of mobile wireless communication nodes which contend for communication resources of the MANET, comprising:
from nodes of said set of contending nodes, synchronously transmitting a corresponding plurality of frequency tones;
selecting some of the nodes of said set of contending nodes in response to the plurality of frequency tones;
removing the selected nodes from said set of contending nodes; and
after said removing step, transmitting data packets from a plurality of nodes that remain in said set of contending nodes to respectively corresponding destination mobile wireless communication nodes of the MANET on respectively different frequency channels.

2. The method of claim 1, wherein said selecting step includes estimating a number of nodes in said set of contending nodes in response to said plurality of frequency tones.

3. The method of claim 2, wherein said selecting step includes determining a target density based on the estimated number of nodes.

4. The method of claim 3, wherein said selecting step includes determining a probability value based on said target density.

5. The method of claim 2, wherein said estimating step includes receiving at least some of the frequency tones and counting the received frequency tones.

6. The method of claim 5, wherein said estimating step includes transmitting a frequency tone that is indicative of a number of received frequency tones counted in said counting step.

7. The method of claim 1, including using the transmitted frequency tones to indicate respective frequency channels proposed for communication with respective desired destination mobile wireless communication nodes in the MANET.

8. The method of claim 1, including selecting each of the transmitted frequency tones randomly from a predetermined set of available frequency tones.

9. The method of claim 1, wherein said transmitting step includes transmitting the plurality of frequency tones simultaneously during a predetermined period of time.

10. The method of claim 1, wherein said selecting step includes using the transmitted frequency tones to indicate respective addresses of desired destination mobile wireless communication nodes in the MANET.

11. The method of claim 10, including using the transmitted frequency tones to indicate respective frequency channels proposed for communication with the respective destination nodes.

12. The method of claim 1, wherein said selecting step includes receiving and recognizing at least some of the transmitted frequency tones, and thereafter transmitting the recognized frequency tones again.

13. A mobile wireless communication apparatus for use in a mobile ad hoc network (MANET) as one of a set of mobile wireless communication nodes of the MANET which contend for communication resources of the MANET, comprising:
- a wireless communication interface for supporting wireless communication with other nodes of the MANET;
- a contention resolution controller coupled to said wireless communication interface and cooperable with other nodes of the MANET for determining in response to a plurality of frequency tones signaled synchronously in the MANET whether said mobile wireless communication apparatus should be removed from said set of contending nodes;
- a communication controller coupled to said wireless communication interface and cooperable therewith for supporting wireless communication of data packets associated with a user communication application; and
- said contention resolution controller coupled to said communication controller, said contention controller cooperable with said communication controller and said wireless communication interface in response to a determination that the mobile wireless communication apparatus is not removed from said set of contending nodes for permitting wireless communication of said data packets on a first communication channel while other nodes of the MANET are simultaneously transmitting data packets on respective communication channels which are different from one another and which are different from said first communication channel.

14. The apparatus of claim 13, wherein said contention resolution controller is cooperable with said wireless communication interface for transmitting at least one of said frequency tones.

15. The apparatus of claim 13, wherein said contention resolution controller is cooperable with said wireless communication interface for receiving at least some of said plurality of frequency tones.

16. The apparatus of claim 15, wherein said contention resolution controller is cooperable with said wireless communication interface for counting the received frequency tones and transmitting a frequency tone that is indicative of a number of said counted frequency tones.

17. A mobile ad hoc network (MANET) comprising:
- a plurality of mobile wireless communication nodes, including a set of said mobile wireless communication nodes which contend for communication resources of the MANET; and
- a contention resolution system distributed among said plurality of mobile wireless communication nodes, said contention resolution system operable for selecting some of the nodes of said set of contending nodes in response to a corresponding plurality of frequency tones transmitted synchronously from nodes of said set of contending nodes and further operable for removing the selected nodes from said set of contending nodes; and
- said contention resolution system operable after removing the selected nodes from said set of contending nodes for effectuating transmission of data packets from a plurality of nodes that remain in said set of contending nodes to respectively corresponding destination nodes of the MANET on respectively different frequency channels.

18. The mobile ad hoc network of claim 17, wherein said contention resolution system is further for estimating a number of nodes in said set of contending nodes in response to said plurality of frequency tones.

19. The mobile ad hoc network of claim 18, wherein said contention resolution system is further for determining a target density based on the estimated number of nodes.

20. The mobile ad hoc network of claim 19, wherein said contention resolution system is further for determining a probability value based on said target density.

* * * * *